(12) United States Patent
Liang et al.

(10) Patent No.: US 11,347,200 B2
(45) Date of Patent: May 31, 2022

(54) CONTROLLER

(71) Applicant: FANUC CORPORATION, Yamanashi (JP)

(72) Inventors: Yao Liang, Yamanashi (JP); Yuuki Kumamoto, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/985,228

(22) Filed: Aug. 5, 2020

(65) Prior Publication Data
US 2021/0072724 A1    Mar. 11, 2021

(30) Foreign Application Priority Data
Sep. 6, 2019    (JP) .............................. JP2019-163012

(51) Int. Cl.
| | |
|---|---|
| *G05B 19/408* | (2006.01) |
| *G05B 19/409* | (2006.01) |
| *G05B 19/4063* | (2006.01) |
| *G05B 19/19* | (2006.01) |

(52) U.S. Cl.
CPC ........... *G05B 19/408* (2013.01); *G05B 19/19* (2013.01); *G05B 19/409* (2013.01); *G05B 19/4063* (2013.01)

(58) Field of Classification Search
CPC ................ G05B 19/408; G05B 19/409; G05B 19/4063; G05B 19/19; G05B 2219/50139; G05B 19/40937; G05B 19/4142; G05B 2219/34013; Y02P 90/02
See application file for complete search history.

(56) References Cited

U.S. PATENT DOCUMENTS

| | | | | |
|---|---|---|---|---|
| 5,400,260 | A * | 3/1995 | Matsumura | ...... G05B 19/40937 |
| | | | | 700/180 |
| 6,597,142 | B2 * | 7/2003 | Shibukawa | ...... G05B 19/40937 |
| | | | | 318/569 |
| 2002/0195983 | A1 * | 12/2002 | Iwashita | .............. G05B 19/408 |
| | | | | 318/567 |

(Continued)

FOREIGN PATENT DOCUMENTS

| | | |
|---|---|---|
| JP | 2002171780 A | 6/2002 |
| JP | 200358218 A | 2/2003 |
| JP | 2007280190 A | 10/2007 |

*Primary Examiner* — Christopher E. Everett
(74) *Attorney, Agent, or Firm* — Hauptman Ham, LLP (57) ABSTRACT

A controller includes a storage unit storing a plurality of sets of recommended setting values or recommended setting ranges regarding parameters for controlling an axis of a machine tool or an industrial machine or for controlling a motor, wherein set contents of the plurality of sets of recommended setting values or recommended setting ranges vary depending on a property of the machine tool, the industrial machine, or the motor; a comparing unit configured to compare input parameters with the recommended setting values or the recommended setting ranges corresponding to the property of a control target; and a comparison result presenting unit configured to present a warning when the input parameters differ from the recommended setting values or deviate from the recommended setting ranges corresponding to the property of the control target.

9 Claims, 6 Drawing Sheets

(56) References Cited

U.S. PATENT DOCUMENTS

| | | | |
|---|---|---|---|
| 2003/0045964 A1* | 3/2003 | Lottgen | G05B 19/409 |
| | | | 700/180 |
| 2017/0097629 A1* | 4/2017 | Shindou | G05B 19/4083 |
| 2018/0024519 A1* | 1/2018 | Peluso | G05B 19/4065 |
| | | | 340/679 |

* cited by examiner

CONTROLLER

RELATED APPLICATIONS

The present application claims priority to Japanese Application Number 2019-163012, filed Sep. 6, 2019, the disclosure of which is hereby incorporated by reference herein in its entirety.

BACKGROUND OF THE INVENTION

1. Field of the Invention

The present invention relates to a controller for controlling a machine tool, an industrial machine or a motor.

2. Description of the Related Art

Systems for supporting input of parameters to a device, such as a CNC device (computer numerical controller), have been proposed. Japanese Unexamined Patent Publication (Kokai) No. 2003-058218 discloses that, with regard to parameters of a CNC device, "a plurality of sets of parameters are prepared in a memory in a CNC 1 in the form of a parameter set including a plurality of types of parameters respectively configured according to precision priority, speed priority, shock reduction priority, etc." (paragraph 0018). Japanese Unexamined Patent Publication (Kokai) No. 2007-280190 discloses that, with regard to a management means of a machine tool, "the display output means 6 has a standard setting state storage unit 16 that defines a predetermined standard setting state for various setting items of the setting means 11, and a comparing unit 17 that compares the setting state of the setting means 11 with the predetermined standard setting state stored in the standard setting state storage unit 16 and displays a changed setting state for a setting item that deviates from the predetermined standard setting state" (paragraph 0018).

Japanese Unexamined Patent Publication (Kokai) No. 2002-171780 discloses "a control parameter setting method for setting a plurality of control parameters of an electric motor drive device using a display device and an input device of a computer, comprising (a) a step of displaying a plurality of previously prepared applications of the electric motor on the display device and prompting an operator to select and input an application; (b) a step of providing a table defining a correspondence between the application and a control parameter to be set corresponding to the application and its recommended value, and obtaining the control parameter to be set and its recommended value by referring to the table in accordance with an application selected and input by the operator" (Claim 4).

SUMMARY OF THE INVENTION

Setting work of parameters on a CNC device, etc., requires advanced knowledge and the degree of difficulty of the setting work is high. There is a need for a controller that can further ease parameter setting by a user and enable accurate parameter setting.

An aspect of the present disclosure provides a controller comprising a storage unit storing a plurality of sets of recommended setting values or recommended setting ranges regarding parameters for controlling an axis of a machine tool or an industrial machine or for controlling a motor, wherein set contents of the plurality of sets of recommended setting values or recommended setting ranges vary depending on a property of the machine tool, the industrial machine, or the motor; a comparing unit configured to compare the input parameters with the recommended setting values or the recommended setting ranges corresponding to the property of a control target being one of the machine tool, the industrial machine, and the motor, among the plurality of sets of the recommended setting values or the recommended setting ranges; and a comparison result presenting unit configured to present, as a comparison result by the comparing unit, a warning when the input parameters differ from the recommended setting values or deviate from the recommended setting ranges corresponding to the property of the control target.

BRIEF DESCRIPTION OF THE DRAWINGS

The objects, features and advantages of the present invention will become more apparent from the description of the following embodiment in connection with the accompanying drawings, in which.

DETAILED DESCRIPTION

An embodiment of the present disclosure will be described below with reference to the accompanying drawings. Corresponding components are denoted by common reference numerals throughout the drawings. In order to facilitate understanding, the scale of these drawings is appropriately changed. In addition, the forms shown in the drawings are examples for carrying out the present invention, and the present invention is not limited to the illustrated forms.

Figure 1:
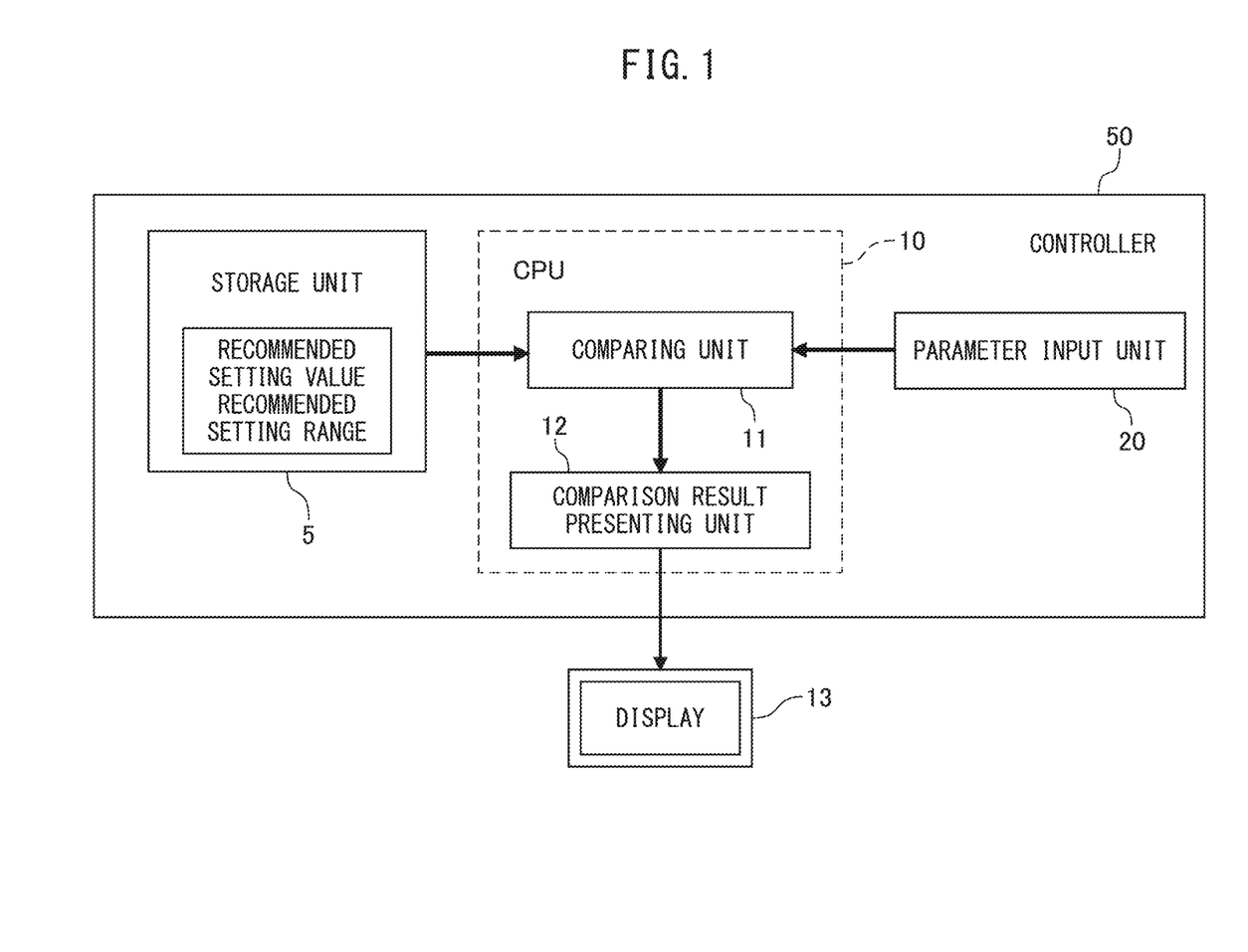
FIG. 1 is a block diagram showing a main portion of a controller according to an embodiment.

FIG. 1 is a block diagram showing a main portion of a controller 50 according to an embodiment. The controller 50 is, for example, a CNC device (computer numerical controller) for controlling a machine tool, but the present invention is not limited to such an example. The controller 50 may be configured as one of various controllers such as a CNC device for controlling an axis (a spindle axis, a feed axis, etc.) of a machine tool or an industrial machine, and a motor controller for controlling a motor. As shown in FIG. 1, the controller 50 includes a storage unit 5, a parameter input unit 20, a comparing unit 11, a comparison result presenting unit 12, and a display 13 as main components. In the storage unit 5, recommended setting values and recommended setting ranges of parameters for controlling the machine tool have been stored in advance. The parameter input unit 20 is constituted by an operation device such as an operation panel, and accepts a parameter inputting/setting operation by a user. The comparing unit 11 compares the input parameter with the recommended setting value or the recommended setting range stored in the storage unit 5. The comparison result presenting unit 12 presents, as a comparison result by the comparing unit 11, a warning when the input parameter and the recommended setting value or the recommended setting range are different from each other. Note that the controller 50 has components as a CNC such as a spindle axis control unit, a feed axis control unit, and an input-output interface, but these components are omitted from FIG. 1 for convenience of explanation.

In FIG. 1, the comparing unit 11 and the comparison result presenting unit 12 are described as functional blocks realized by a CPU 10 executing software, but the present invention is not limited to this example. These functional blocks may be realized by a hardware-based configuration such as an ASIC (Application Specific Integrated Circuit).

The storage unit 5 stores, as the recommended setting values or the recommended setting ranges relating to parameters for controlling an axis of a machine tool or an industrial machine or for controlling a motor, a plurality of sets of the recommended setting values or the recommended setting ranges (hereinafter also referred to as a recommended parameter set) of which the set contents vary depending on a property of a machine tool, an industrial machine, or a motor. In this case, the plurality of sets of the recommended setting values or the recommended setting ranges may be set so that numerical values or numerical ranges vary stepwise depending on the property of the machine tool, industrial machine, or motor (a size, a type, etc., of the machine tool, etc.). Hereinafter, an example of a case where, as a classification item representing the property of the machine tool, inertia (e.g., inertia of a control target such as a spindle axis or a motor), a stroke (e.g., a stroke of a control target such as a spindle axis), or a size of a tool can be specified will be described.

For example, regarding the inertia, the controller 50 can accept, from the user, specifying of a magnitude of the inertia as the mechanical property of the machine tool, and can apply the recommended parameter set corresponding to the designated property (e.g., large inertia) from among a plurality of recommended parameter sets.

Table 1 below shows an example of the plurality of recommended parameter sets set in a stepped manner in terms of inertia as an aspect of a mechanical property of a machine tool. Here, as an example, a case where the recommended parameter set is created by dividing the inertia into three stages of small, medium, and large sizes is shown.

TABLE 1

|  | Small | Medium | large |
| --- | --- | --- | --- |
| Inertia [kgm²] | 0.0023-0.0035 | 0.011-0.016 | 0.84-1.3 |
| Servo loop gain | Recommended setting range 1 | Recommended setting range 1-$\alpha_1$ | Recommended setting range 1-$\beta_1$ |
| Speed feedforward coefficient function | Effective (Recommended) | Effective (Recommended) | Effective (Recommended) |
| Speed feedforward coefficient | Recommended setting range 2 | Recommended setting range 2-$\alpha_2$ | Recommended setting range 2-$\beta_2$ |
| Acceleration | Recommended setting range 3 | Recommended setting range 3-$\alpha_3$ | Recommended setting range 3-$\beta_3$ |

TABLE 1-continued

|  | Small | Medium | large |
| --- | --- | --- | --- |
| Jerk | Recommended setting range 4 | Recommended setting range 4-$\alpha_4$ | Recommended setting range 4-$\beta_4$ |

$0 < \alpha_i < \beta_i$ i = 1-4

In the example in Table 1, machine tools are classified into three stages: small, medium, and large sizes in terms of inertia. Small, medium and large sizes correspond to inertia ranges of 0.0023-0.0035 kgm², 0.011-0.016 kgm², and 0.84-1.3 kgm², respectively. In this example, the parameters include the servo loop gain, presence or absence of the speed feedforward coefficient function, the speed feedforward coefficient, acceleration, and jerk. As shown in Table 1, the servo loop gain is set to "recommended setting range 1", "recommended setting range 1-$\alpha_1$", and "recommended setting range 1-$\beta_1$" for small, medium, and large sizes, respectively, and since $0<\alpha_i<\beta_i$ (i=1-4), when the recommended setting range for the small size is used as a reference, the numerical range of the servo loop gain for the medium size is set smaller than that for the small size and the numerical range of the servo loop gain for the large size is set smaller than that for the medium size. Similarly, regarding the speed feedforward coefficient, the acceleration, and the jerk, when the recommended setting range for a small machine tool is used as a reference, the numerical range for the medium size is set smaller than that for the small size and the numerical range for the larger size is set smaller than that for the medium size. In Table 1, an example is described in which numerical ranges are specified as recommended settings for the servo loop gain, the speed feedforward coefficient, the acceleration, and the jerk; however, recommended values may be specified instead.

Table 2 below shows an example of a plurality of recommended parameter sets prepared in a stepped manner in terms of a stroke as an aspect of the mechanical property of the machine tool. Here, as an example, a case where the recommended parameter set is created by dividing the stroke into three stages of "short", "medium" (middling), and "long" is shown.

TABLE 2

|  | Short | Medium | Long |
| --- | --- | --- | --- |
| Stroke [m] | 1.5-2 | 4 | 8 |
| Servo loop gain | Recommended setting range 5 | Recommended setting range 5-$\alpha_5$ | Recommended setting range 5-$\beta_5$ |
| Speed feedforward coefficient function | Effective (Recommended) | Effective (Recommended) | Effective (Recommended) |
| Speed feedforward coefficient | Recommended setting range 6 | Recommended setting range 6-$\alpha_6$ | Recommended setting range 6-$\beta_6$ |
| Acceleration | Recommended setting range 7 | Recommended setting range 7-$\alpha_7$ | Recommended setting range 7-$\beta_7$ |
| Jerk | Recommended setting range 8 | Recommended setting range 8-$\alpha_8$ | Recommended setting range 8-$\beta_8$ |

$0 < \alpha_i < \beta_i$ i = 5-8

In the classifications of Table 2 above, "short," "medium", and "long" correspond to 1.5-2 m, 4 m, and 8 m, respectively, as ranges or values of the stroke. In this example, the parameters include the servo loop gain, the presence or absence of the speed feedforward coefficient function, the speed feedforward coefficient, the acceleration, and the jerk. As shown in Table 2, the servo loop gain is set to "recommended setting range 5", "recommended setting range 5-$\alpha_5$", and "recommended setting range 5-$\beta_5$", for "short", "medium", and "long", respectively, and since $0<\alpha_i<\beta_i$ (i=5-8), when the recommended setting range for "short" is used as a reference, the numerical range of the servo loop gain for "medium" is set to be smaller than that for "short" and the numerical range of the servo loop gain for "long" is set to be smaller than that for "medium". Similarly, regarding the speed feedforward coefficient, the acceleration, and the jerk, when the recommended setting range for the machine tool of "short" is used as a reference, the numerical range for "medium" is set smaller than that for "short" and the numerical range for "long" is set to be smaller than that for "medium".

According to the above-described classification of the recommended parameter set, a user can apply, to a machine tool to be controlled, a set of optimum recommended setting values or recommended setting ranges according to the specified mechanical property of the machine tool by specifying the mechanical property of the machine tool. Such scheme of setting the recommended setting value (setting range) on the basis of the property of a control target is easily understandable for the user and makes it possible to accurately verify the input parameters.

The controller 50 compares the parameter value set by the user with the recommended setting value or the recommended setting range corresponding to the mechanical property specified as described above, and displays a warning when the parameter set by the user is different from the recommended setting value or deviates from the recommended setting range to prompt the user to re-input the parameter.

Figure 2:
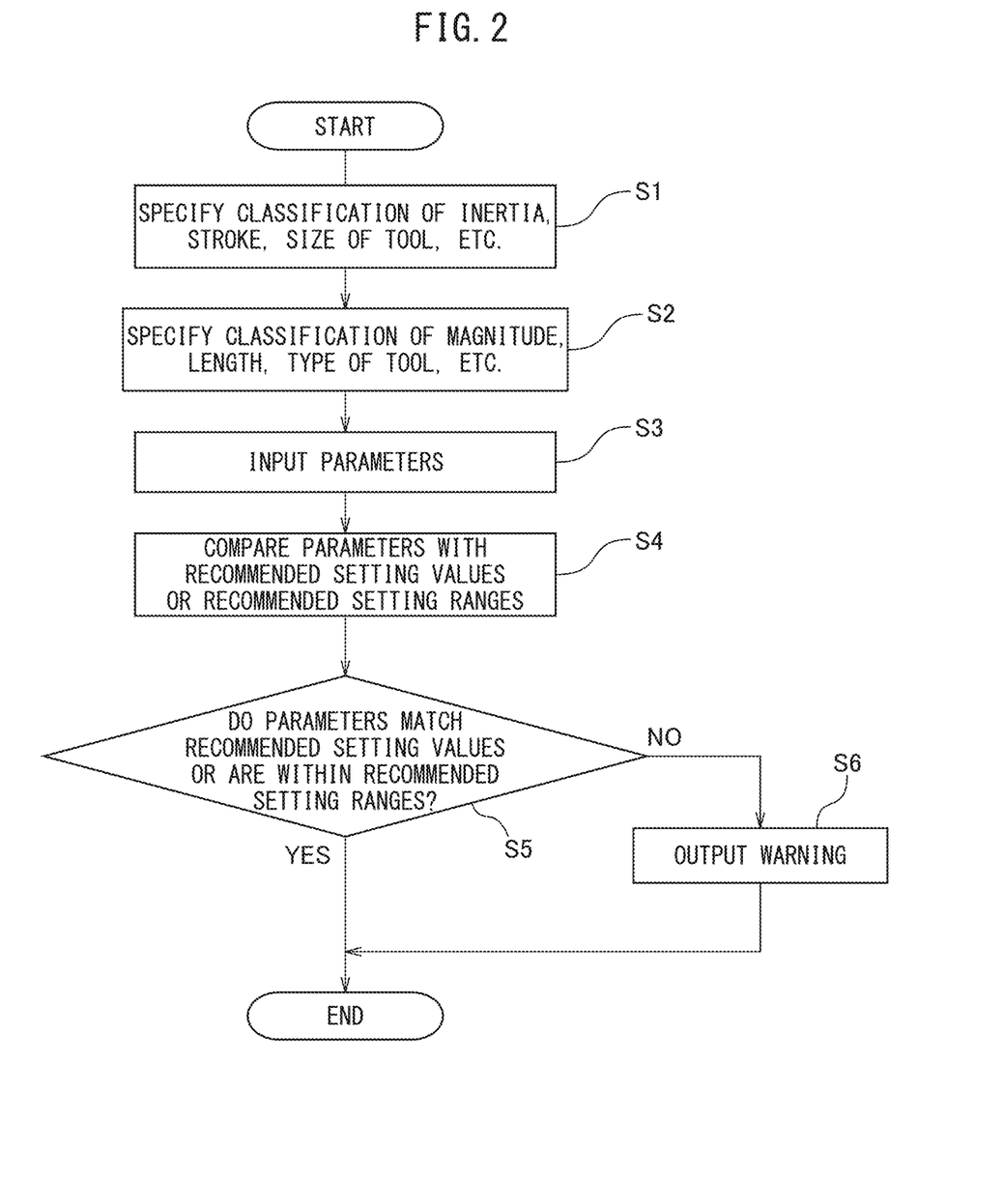
FIG. 2 is a flowchart showing a parameter setting and verification process executed by the controller.
Figure 3:
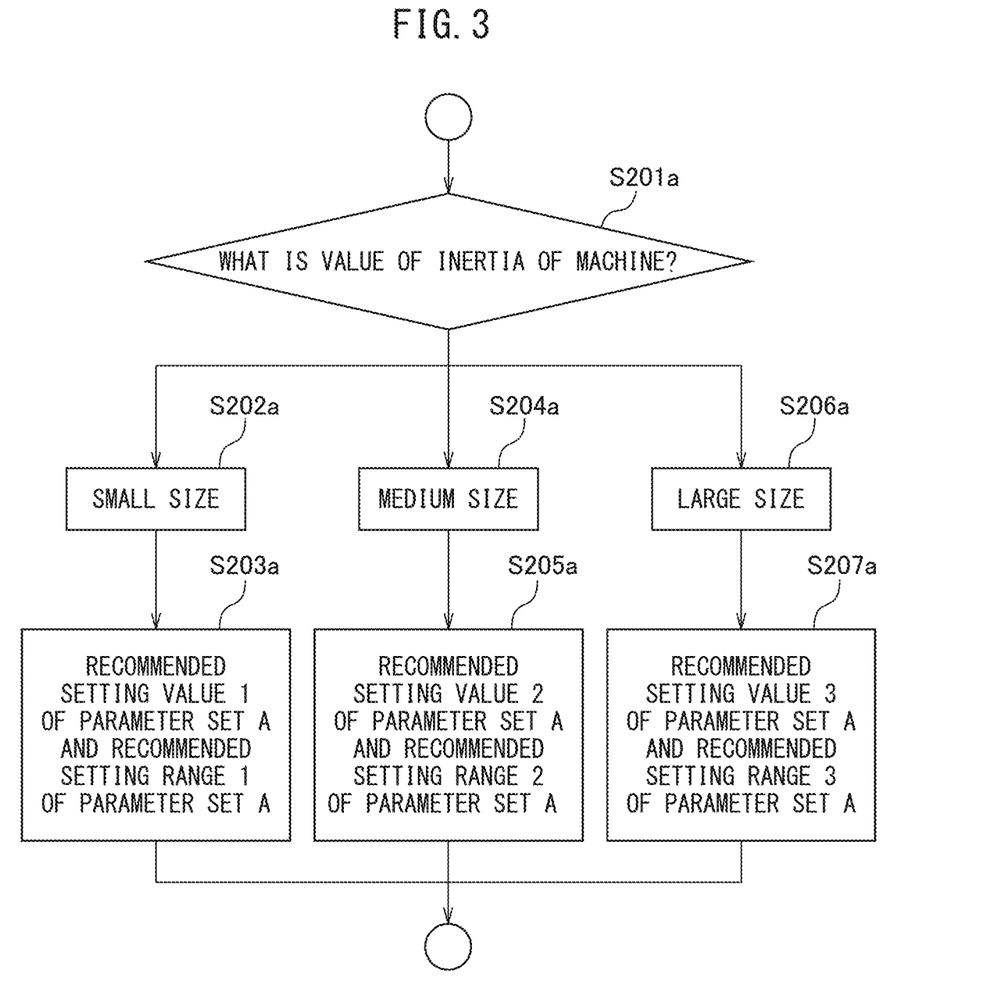
FIG. 3 is an operation flow showing a process of reading a recommended parameter set from a storage unit in the controller in a case where a specified property of a control target is inertia.
Figure 4:
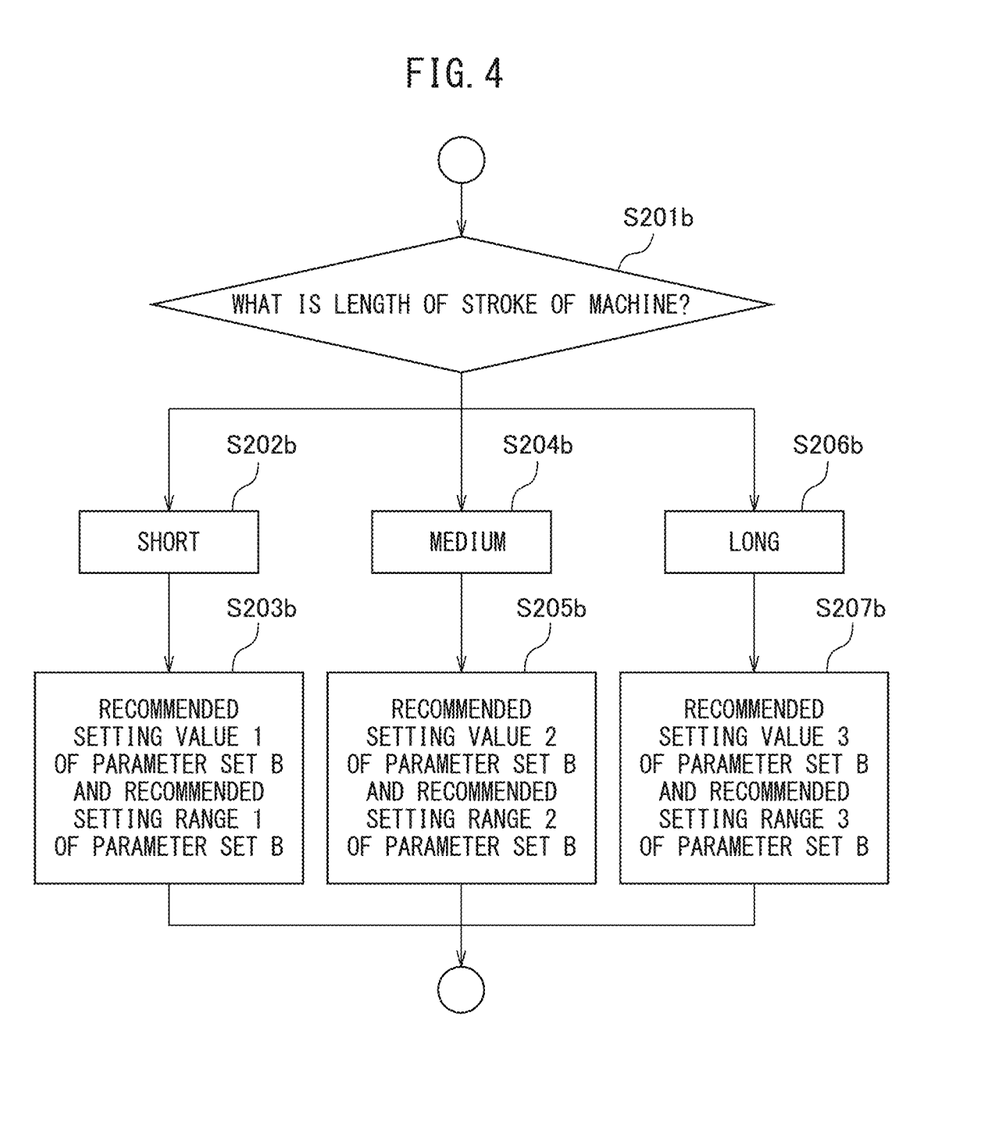
FIG. 4 is an operation flow showing the process of reading the recommended parameter set from the storage unit in the controller in a case where the specified property of the control target is a stroke.
Figure 5:
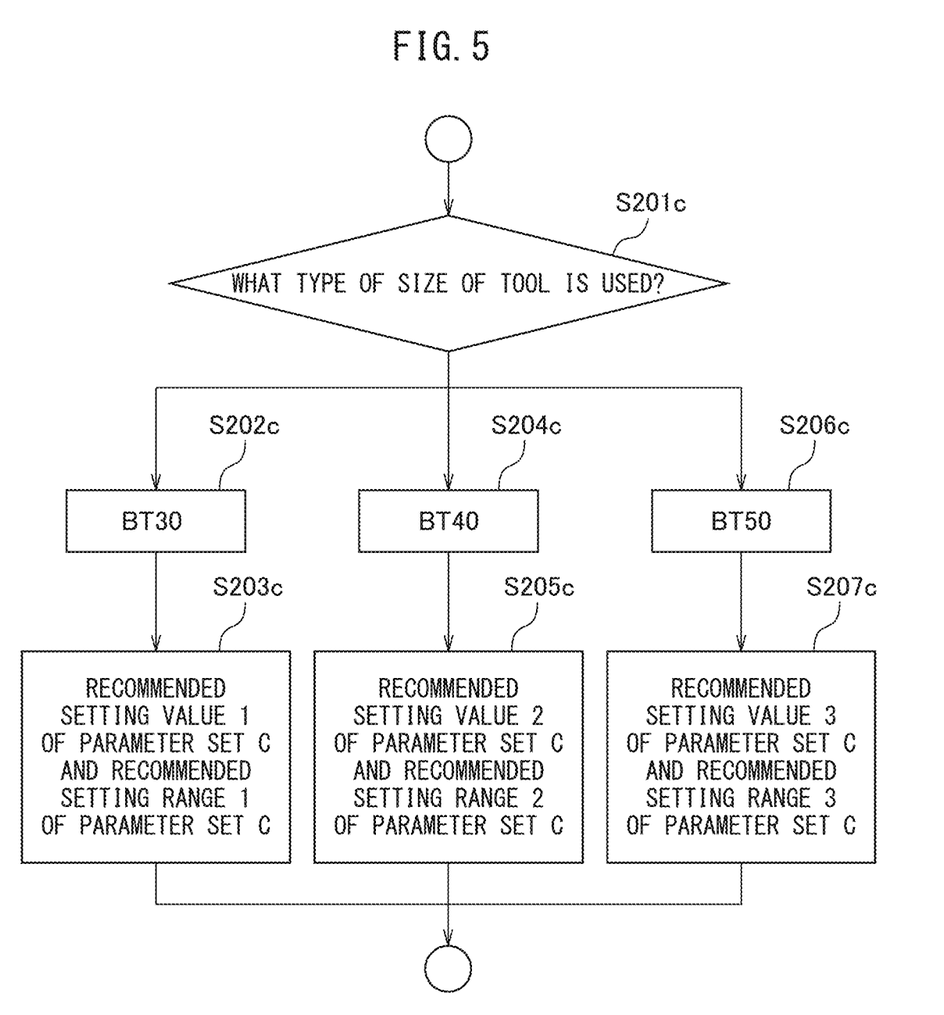
FIG. 5 is an operation flow showing the process of reading the recommended parameter set from the storage unit in the controller in a case where the specified property of the control target is a size of a tool.

FIG. 2 is a flowchart showing a parameter setting and verification process executed by the controller 50. The parameter setting and verification process is performed under control of the CPU 10 of the controller 50. First, the controller 50 accepts specifying of the mechanical property of the machine tool by the user (steps S1 and S2). Specifically, the user specifies which of the inertia, the stroke, the size of the tool, etc. is used as the property (classification item) (step S1), and specifies a magnitude when the property is the inertia, a length when the property is the stroke, and a type of the tool when the property is the size of the tool (classification item) (step S2). FIG. 3, FIG. 4, and FIG. 5 are operation flows showing processes of reading the recommended parameter set from the storage unit 5 in the controller 50 when the specified property is the inertia, the stroke, and the size of the tool, respectively. The processes of FIGS. 3 to 5 are executed in step S2.

As shown in FIG. 3, when the property specified by the user is the inertia, the controller 50 checks the specified magnitude (step S201a). As a result, when the small size is specified for the inertia (step S202a), the controller 50 acquires the recommended setting values and the recommended setting ranges for the small size of the recommended parameter set shown in Table 1 (hereinafter referred to as a parameter set A) from the storage unit 5 (step S203a).

When the medium size is specified for the inertia (step S204a), the controller 50 acquires the recommended setting values and the recommended setting ranges for the medium size of the parameter set A from the storage unit 5 (step S205a).

When the large size is specified for the inertia (step S206a), the controller 50 acquires the recommended setting values and recommended setting ranges for the large size of the parameter set A from the storage unit 5 (step S207a).

As shown in FIG. 4, when the property specified by the user is the stroke, the controller 50 checks the specified length (step S201b). As a result, when "short" is specified for the stroke (step S202b), the controller 50 acquires the recommended setting values and the recommended setting ranges for "short" of the recommended parameter set (hereinafter referred to as a parameter set B) shown in Table 2 from the storage unit 5 (step S203b).

When "medium" is specified for the stroke (step S204b), the controller 50 acquires the recommended setting values and the recommended setting ranges for "medium" of the parameter set B from the storage unit 5 (step S205b).

When "long" is specified for the stroke (step S206b), the controller 50 acquires the recommended setting values and the recommended setting ranges for "long" of the parameter set B from the storage unit 5 (step S207b).

As shown in FIG. 5, when the property specified by the user is the size of the tool, the controller 50 checks the type of the specified tool (step S201c). As a result, when "BT30" is specified for the type of the tool (step S202c), the controller 50 acquires the recommended setting values and the recommended setting ranges of the recommended parameter set (hereinafter referred to as parameter set C) stored in the storage unit 5 as the recommended setting values and the recommended setting ranges for the type of the tool "BT30" (step S203c).

When "BT40" is specified for the type of the tool (step S204c), the controller 50 acquires the recommended setting values and the recommended setting ranges of the parameter set C stored in the storage unit 5 as the recommended setting values and the recommended setting ranges for the type of the tool "BT40" (step S205c).

When "BT50" is specified for the type of the tool (step S206c), the controller 50 acquires the recommended setting values and the recommended setting ranges of the parameter set C stored in the storage unit 5 as the recommended setting values and the recommended setting ranges for the type of the tool "BT50" (step S207c). Note that the parameter set C also includes the types of parameters similar to those of the parameter set A, and therefore, in the parameter set C, the recommended numerical range of the parameter such as servo loop gain may be set to decrease, as the size of the tool increase.

Next, the user inputs the parameters (step S3). The parameters are input via the parameter input unit 20. Next, the controller 50 compares the parameters input by the user with the recommended setting values and the recommended setting ranges read out from the storage unit 5 by the processes of FIGS. 3 to 5 described above (step S4). As a comparison result, when the parameters set by the user match the recommended setting values or are within the recommended setting ranges (S5: YES), it is concluded that there are no problems in the parameters set by the user, and the parameter setting and verification process ends.

Conversely, when the parameters set by the user are different from the recommended setting values or deviate from the recommended setting ranges (S5: NO), the comparison result presenting unit 12 presents a warning (step S6). The warning in this case may take various types of presenting forms that informs the user that there is a problem in the set parameters. For example, the presenting form may be displaying, on the display 13, a warning message informing that the set parameters are different from the recommended setting values (or deviate from the recommended setting ranges), or highlighting problematic parameters on the display 13. The comparison result presenting unit 12 may present, together with the warning message, information indicating how much the set parameters deviate from the recommended setting values (recommended setting ranges), or the recommended setting values (recommended setting ranges) themselves.

According to such a parameter setting and verification process, the user can cause the controller 50 to read out the optimum recommended parameter set and can apply the optimum recommended parameter set to the verification of the parameters by specifying the property of a control target such as the magnitude of the inertia. Therefore, it is possible to ease the parameter setting by the user and to enable the user to perform appropriate parameter setting.

Figure 6:
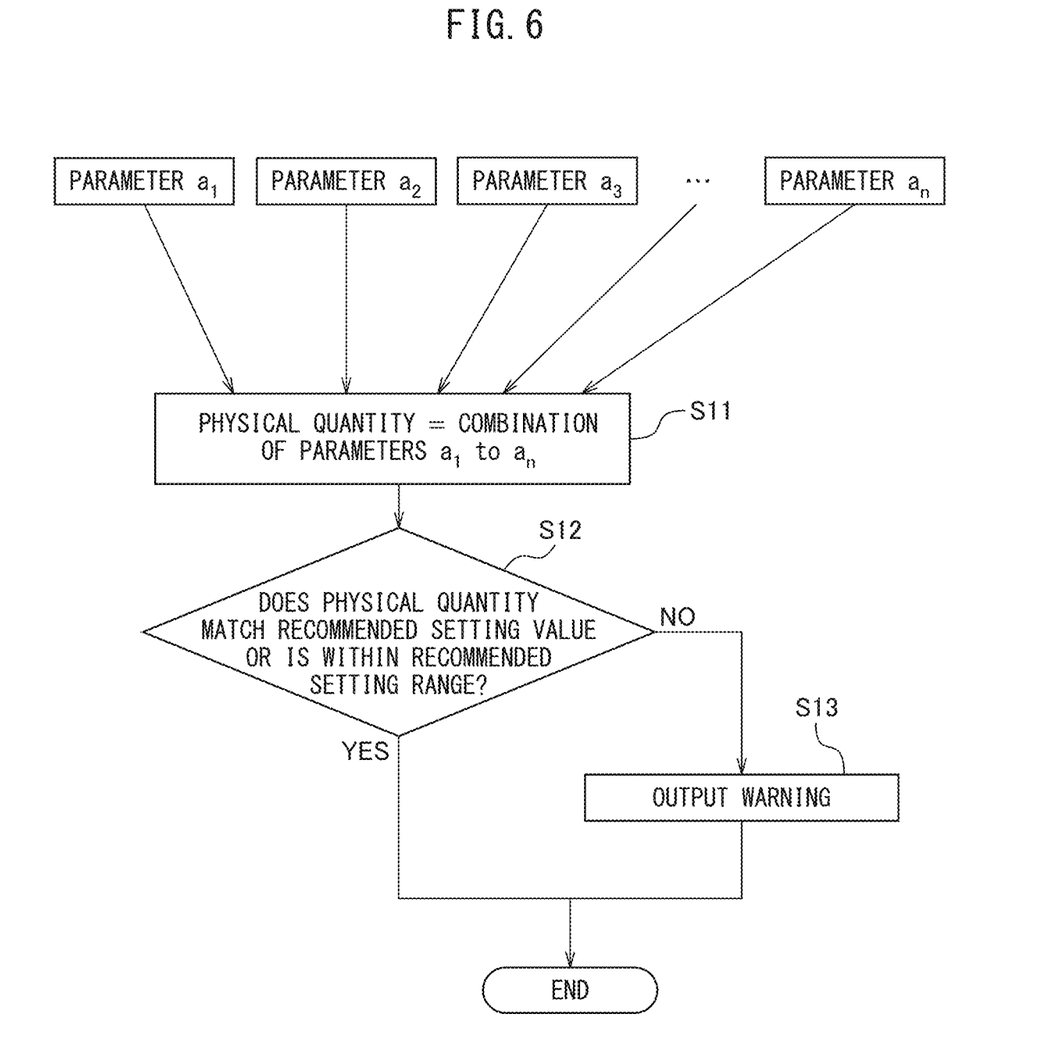
FIG. 6 is an operation flow showing another example of comparison between a parameter input by a user and a recommended setting value or a recommended setting range by a comparing unit.

FIG. 6 is an operation flow showing another example of comparison between parameters input by the user and the recommended setting values or the recommended setting ranges by the comparing unit 11. In executing a process of FIG. 6, it is assumed that the specifying of the mechanical property of a control target and the input of the parameters in steps S1 to S3 of FIG. 2 have been performed. In this example, as shown in FIG. 6, based on a set of parameters (parameters $a_1$-$a_n$) related to a predetermined physical quantity among a plurality of input parameters, the comparing unit 11 calculates the physical quantity (step S11). Then, the comparing unit 11 compares the calculated physical quantity with a recommended setting value or a recommended setting range (step S12). When, as a comparison result, the calculated physical quantity matches the recommended setting value or is within the recommended setting range (S12: YES), it is concluded that there are no problems in the parameters $a_1$-$a_n$ input by the user, and the process ends.

Conversely, when the calculated physical quantity does not match the recommended setting value or deviates from the recommended setting range (S12: NO), the comparison result presenting unit 12 may present a warning in the same manner as in step S6 to indicate that there is a problem in the parameters $a_1$-$a_n$ defining the physical quantity (step S13). For example, the physical quantity calculated as a combination of parameters may include the acceleration and a maximum jerk as described below.

Example 1 of physical quantities: Acceleration
Parameter $a_1$: Feed rate
Parameter $a_2$: Time constant
Acceleration: Feed rate/time constant
Example 2 of physical quantities: Maximum jerk
Parameter $a_1$: Maximum acceleration
Parameter $a_2$: Time constant
Maximum jerk: Maximum acceleration/time constant As described above, when the physical quantity is the acceleration, the comparing unit 11 calculates the acceleration (feed rate/time constant) from the two input parameters, the parameter $a_1$ (feed rate) and the parameter $a_2$ (time constant), and compares the calculated acceleration with the value of the acceleration set as the recommended setting value or the recommended setting range. When the physical quantity is the maximum jerk, the comparing unit 11 calculates the maximum jerk (maximum acceleration/time constant) from the two input parameters, the parameter $a_1$ (maximum acceleration) and the parameter $a_2$ (time constant), and compares the calculated maximum jerk with the value of the maximum jerk set as the recommended setting value or the recommended setting range.

By calculating the predetermined physical quantity as a combination of parameters input by the user on the controller 50 and comparing the calculated predetermined physical quantity with the recommended setting value or the recommended setting range in this manner, it is possible to perform more efficient parameter verification while reducing a burden of parameter input by the user.

As described above, according to the present embodiment, it is possible to further ease the parameter setting by the user and to enable the user to perform appropriate parameter setting.

While the embodiment of the present disclosure has been described above, it will be understood by those skilled in the art that various modifications and changes may be made without departing from the scope of the disclosure of the following claims.

In the embodiment described above, an example has been described in which the input of the parameters and the specifying of the property of a control target are performed by the user via the parameter input unit 20, but the parameters and the property of a control target may be input to the controller from an external device via a network, for example.

In the embodiment described above, an example has been described in which the user specifies the inertia and the stroke as the property of a control target, but values estimated as the inertia and the stroke by the controller 50 may be used. As an example, the controller 50 may estimate the inertia of a spindle axis based on a load torque of a spindle axis motor and rotational angular acceleration of the spindle axis detected by sensors. Further, the controller 50 may estimate the stroke based on position information of a control target axis detected by a position sensor.

In the above-described embodiment, an example of the recommended parameter set (e.g., small size, medium size, and large size for the inertia) that can be switched between the three stages depending on the property of the machine tool or the like has been described. However, for example, the inertia may be classified in finer levels, and a larger number of recommended parameter sets may be prepared accordingly.

A program for executing the parameter setting and verification process described in the above-described embodiment can be recorded on a variety of recording media readable by a computer (for example, a semiconductor memory such as ROM, a EEPROM, a flash memory, or the like, a magnetic recording medium, an optical disk such as a CD-ROM, a DVD-ROM, or the like).

The invention claimed is:

1. A controller, comprising:
a storage unit storing a plurality of sets of recommended setting values or recommended setting ranges regarding parameters for controlling an axis of a machine tool or an industrial machine or for controlling a motor,
wherein contents or values of the plurality of sets of recommended setting values or recommended setting ranges vary depending on a property of the machine tool, the industrial machine, or the motor;
a comparing unit configured to compare input parameters with the recommended setting values or the recommended setting ranges corresponding to the property of a control target being one of the machine tool, the industrial machine, and the motor, among the plurality of sets of the recommended setting values or the recommended setting ranges; and
a comparison result presenting unit configured to present, as a comparison result by the comparing unit, a warning when the input parameters differ from the recommended setting values or deviate from the recommended setting ranges corresponding to the property of the control target, and wherein
the input parameters include a first input parameter and a second input parameter both of which relate to a physical quantity of a single axis of the machine tool or the industrial robot, or a single motor, and
the comparing unit is configured to
calculate the physical quantity from a combination of the first and the second input parameters, and
compare the calculated physical quantity with the recommended setting values or the recommended setting ranges corresponding to the property of the control target.

2. The controller according to claim 1, wherein the plurality of sets of the recommended setting values or the recommended setting ranges are set such that numerical values or numerical ranges vary stepwise depending on the property of the machine tool, the industrial machine, or the motor.

3. The controller according to claim 1, wherein the plurality of sets of the recommended setting values or the recommended setting ranges are set such that the numerical values or the numerical ranges vary stepwise depending on a size or a type of the machine tool, the industrial machine, or the motor.

4. The controller according to claim 1, wherein
the plurality of sets of the recommended setting values or the recommended setting ranges are set to take stepwise numerical values or numerical ranges according to inertia of the machine tool, the industrial machine, or the motor, and
the comparing unit is configured to compare the input parameters with the recommended setting values or the recommended setting ranges corresponding to the inertia of the control target among the plurality of sets of the recommended setting values or the recommended setting ranges.

5. The controller according to claim 1, wherein
the plurality of sets of the recommended setting values or the recommended setting ranges are set to take stepwise numerical values or numerical ranges according to a stroke of the machine tool, the industrial machine, or the motor, and
the comparing unit is configured to compare the input parameters with the recommended setting values or the recommended setting ranges corresponding to the stroke of the control target among the plurality of sets of the recommended setting values or the recommended setting ranges.

6. The controller according to claim 1, wherein
the plurality of sets of the recommended setting values or the recommended setting ranges are set stepwise according to a size of a tool used in the machine tool, the industrial machine, or the motor, and
the comparing unit is configured to compare the input parameters with the recommended setting values or the recommended setting ranges corresponding to the size of the tool of the control target among the plurality of sets of the recommended setting values or the recommended setting ranges.

7. The controller according to claim 1, further comprising a parameter input unit configured to accept specifying of the property of the control target and input of the parameters.

8. The controller according to claim 1, wherein the parameters include at least two of
a servo loop gain,
presence or absence of a speed feedforward coefficient function,
a speed feedforward coefficient,
acceleration, and
jerk.

9. A controller, comprising:
a storage unit storing a plurality of sets of recommended setting values or recommended setting ranges regarding parameters for controlling an axis of a machine tool or an industrial machine or for controlling a motor,
wherein set contents of the plurality of sets of recommended setting values or recommended setting ranges vary depending on a property of the machine tool, the industrial machine, or the motor;
a comparing unit configured to compare input parameters with the recommended setting values or the recommended setting ranges corresponding to the property of a control target being one of the machine tool, the industrial machine, and the motor, among the plurality of sets of the recommended setting values or the recommended setting ranges; and
a comparison result presenting unit configured to present, as a comparison result by the comparing unit, a warning when the input parameters differ from the recommended setting values or deviate from the recommended setting ranges corresponding to the property of the control target,
wherein
the input parameters include a first input parameter relating to a physical quantity, and a second input parameter relating to the physical quantity,
the comparing unit is configured to
calculate the physical quantity from a combination of the first and the second input parameters, and
compare the calculated physical quantity with the recommended setting values or the recommended setting ranges corresponding to the property of the control target,
the plurality of sets of the recommended setting values or the recommended setting ranges are set to take stepwise numerical values or numerical ranges according to a stroke of the machine tool, the industrial machine, or the motor,
the comparing unit is further configured to compare the input parameters with the recommended setting values or the recommended setting ranges corresponding to the estimated stroke of the control target among the plurality of sets of the recommended setting values or the recommended setting ranges, and
the controller is configured to estimate the stroke based on position information of an axis of the control target detected by a sensor.

* * * * *